T. L. STURTEVANT.
BARBED WIRE FENCING.
APPLICATION FILED DEC. 22, 1917.
1,281,697.
Patented Oct. 15, 1918.
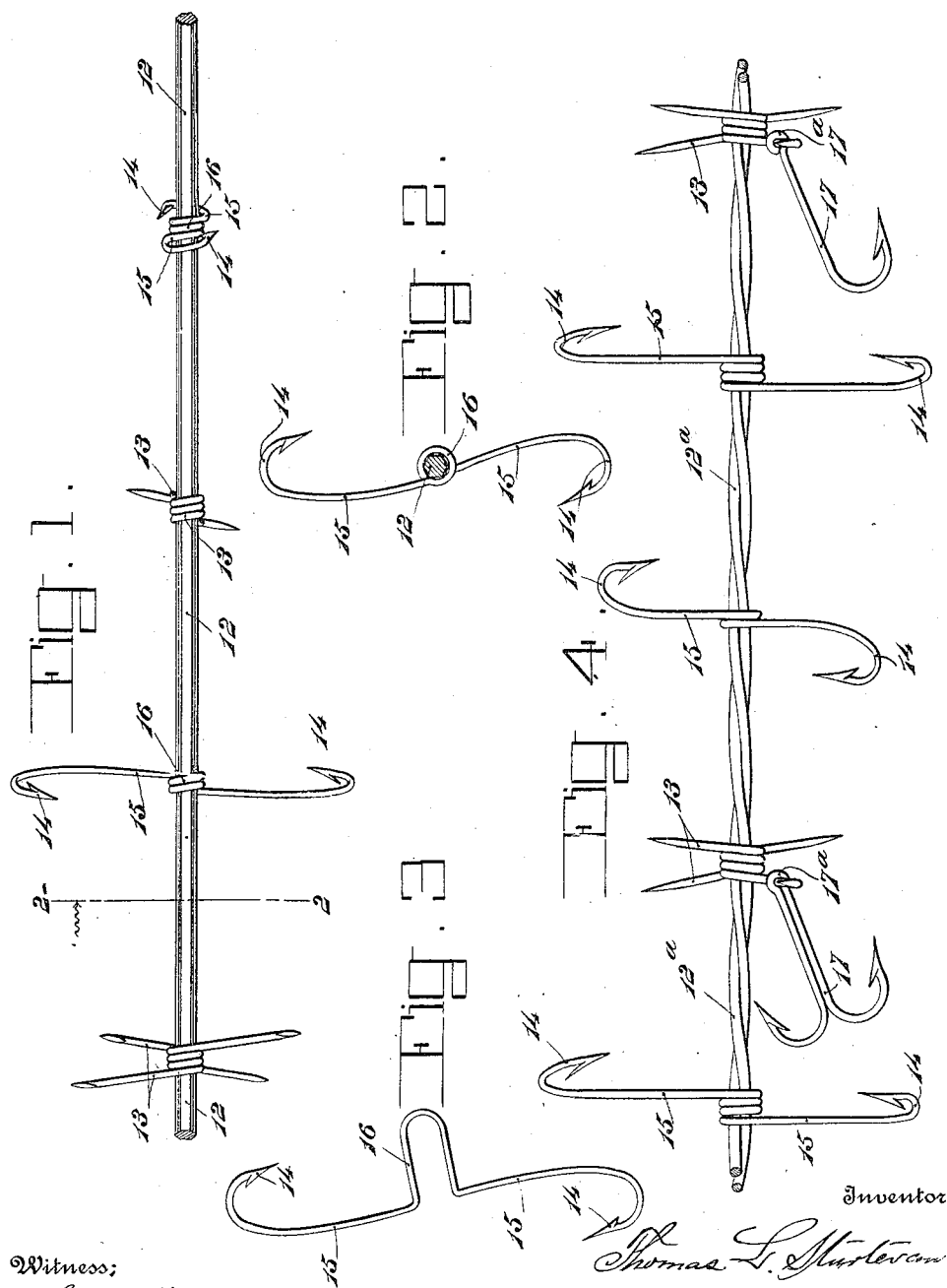

UNITED STATES PATENT OFFICE.

THOMAS L. STURTEVANT, OF QUINCY, MASSACHUSETTS, ASSIGNOR TO STURTEVANT MILL COMPANY, A CORPORATION OF MAINE.

BARBED-WIRE FENCING.

1,281,697.  Specification of Letters Patent.  Patented Oct. 15, 1918.

Application filed December 22, 1917. Serial No. 208,391.

*To all whom it may concern:*

Be it known that I, THOMAS L. STURTEVANT, a citizen of the United States, residing at Quincy, in the county of Norfolk and State of Massachusetts, have invented or discovered certain new and useful Improvements in Barbed-Wire Fencing, of which the following is a specification, reference being had therein to the accompanying drawings.

This invention relates to "war wire" fencing allied to that of my Patent No. 1,142,126, granted June 8, 1915, and has for its object to provide defensive fencing which will be more effective than that now generally in use, by supplementing the barbed wire, after having been placed in position, with fish-hook like members which may alternate with the wire thorns or spurs (termed "barbs") now generally applied to such defensive fence wire.

It has been found difficult to manufacture the "war wire" of my said patent, as special machinery for this purpose is necessary, and barbed wire makers are now too busy to take up new work. Moreover it is difficult to handle the hooked barbed wire of my said patent for the reason that when said wire is wound on reels the hooks are liable to catch each other and will not readily let go, although this hooked barbed wire is recognized by military men as being very desirable and effective. These difficulties are avoided by the present invention which provides barbed hooks, similar to fish-hooks, which may be applied to ordinary war barbed wire, after the latter has been strung on the fence posts, without requiring the use of any special tools or appliances other than heavy gloves to protect the hands of the men. To this end the present invention comprises double barbed hooks, similar to fish hooks, connected by a considerable length of wire which will wind readily so that these barbed hook members may be attached to the longitudinal wires or wire fencing strands between the usual prongs or "barbs", by winding their middle portions around such wires or strands for one or more turns of the fish-hook connecting wire portions, leaving the hooks standing out laterally or otherwise from the longitudinal wires or strands. These connecting wire portions of the fish-hook members should be sufficiently pliant so that they will bend readily, and sufficiently non-elastic so that the turns around the longitudinal wire or wires will stay tightly in place, while the barbed hooks themselves will preferably be hard, like ordinary fish-hooks, and to this end the wires connecting said hooks will preferably be annealed at their middle parts if the wires are too hard to bend readily, or too elastic to "stay put" when wound around the longitudinal wires.

In the accompanying drawings Figure 1 shows a portion of a fencing strand embodying the present invention. Fig. 2 is a cross section of the same on line 2—2, Fig. 1. Fig. 3 illustrates a preferred form of barbed hook member adapted to be readily applied to a barbed wire strand. Fig. 4 illustrates a different form of the invention from that shown in Fig. 1.

Referring to the drawings, 12 denotes a longitudinal wire which will preferably be provided, at intervals with the usual prongs or "barb" members 13, Between these members 13, and preferably alternating therewith, are the hooked members the hooked parts 14 of which are formed at the opposite ends of a connecting wire 15 which will preferably be annealed at its middle part and will preferably have a short loop 16 at or near its center, this loop to be applied to the longitudinal wire 12, to properly space the hooks 14 from and facilitate the application of the hooked member to said longitudinal wire when said hooked member is to be attached by one or more turns of the wire part 15 around the longitudinal wire 12.

When said hooked member is thus attached to the longitudinal wire or strand the hooks 14 will stand out from the said longitudinal wire or strand, in readiness to catch the clothing, etc., of approaching men.

The longitudinal wire or strand may consist either of two or more twisted wires, as is usual in barbed wire fencing, or of a single strong wire, as is also usual in "war wire", and in the latter case the strong wire may be of polygonal form in cross section, as shown in Fig. 2, either hexagonal or otherwise. This polygonal form of the longitudinal wire will check, more or less, any tendancy to turn which either the usual prongs or barbs 13 or the fish-hook members 14, 15, may have.

In the form of the invention shown in Fig. 4, the hooked members 14 are attached to a longitudinal strand 12ª consisting of two twisted wires, as above referred to. In addition to the hooked members 14, 15, other hooked members 17, either single or double, may be connected by being attached to the barb members 13 by having points of such barb members inserted in the eyes or loops 17ª of the hooked members 17 and twisting the points of the barb members around to form tightly closed eyes engaging the said eyes 17ª of the said hooked members.

If desired the double hooked members 17 may be opened out and then be applied to the longitudinal strands by bending the eye portions thereof around said strands, providing, of course, that the said eye portions be annealed or be sufficiently pliant to be properly applied to said longitudinal strands in this manner.

Having thus described my invention, I claim and desire to secure by Letters Patent:—

1. A defensive fencing strand consisting of a longitudinal wire or wires provided at intervals with laterally projecting prongs or spurs and also with outstanding-barbed hooks between said prongs or spurs.

2. A defensive fencing strand consisting of a longitudinal wire or wires provided at intervals with laterally projecting prongs or spurs and also with outstanding barbed hooks between said prongs or spurs, said barbed hooks being integral with a connecting wire having one or more turns around said longitudinal wire or wires.

3. A defensive fencing strand consisting of a longitudinal wire which is polygonal in cross section and which is provided at intervals with laterally projecting prongs or spurs and also with outstanding barbed hooks between said prongs or spurs.

4. A defensive fencing strand consisting of a longitudinal wire which is polygonal in cross section and which is provided at intervals with laterally projecting prongs or spurs and also with outstanding barbed hooks between said prongs or spurs, said barbed hooks being integral with a connecting wire having one or more turns around said longitudinal wire.

5. A barbed wire fencing member consisting of two barbed hooks integral with a pliant, looped, connecting wire part which is adapted to be readily wound around a longitudinal fence wire, leaving a sufficient portion of said connecting wire part to form shanks for said barbed hooks so that they may stand out well from the longitudinal fence wire.

6. A barbed wire fencing member consisting of two barbed hooks integral with a pliant connecting wire part which is adapted to be readily wound around a longitudinal fence wire strand, said connecting wire part having a short loop at its middle part for convenient spacing of said hooks from said longitudinal strand.

In testimony whereof I affix my signature.

THOMAS L. STURTEVANT.

Copies of this patent may be obtained for five cents each, by addressing the "Commissioner of Patents, Washington, D. C."